US 8,248,410 B2

(12) United States Patent
Tan

(10) Patent No.: US 8,248,410 B2
(45) Date of Patent: Aug. 21, 2012

(54) SYNTHESIZING DETAILED DEPTH MAPS FROM IMAGES

(75) Inventor: Kar-Han Tan, Santa Clara, CA (US)

(73) Assignee: Seiko Epson Corporation, Tokyo (JP)

( * ) Notice: Subject to any disclaimer, the term of this patent is extended or adjusted under 35 U.S.C. 154(b) by 924 days.

(21) Appl. No.: 12/331,084

(22) Filed: Dec. 9, 2008

(65) Prior Publication Data

US 2010/0141651 A1    Jun. 10, 2010

(51) Int. Cl.
*G06K 9/36* (2006.01)
(52) U.S. Cl. ........ 345/420; 382/106; 382/154; 382/199; 382/103; 382/107; 382/285; 382/286
(58) Field of Classification Search .................. 382/103, 382/106, 107, 285, 286
See application file for complete search history.

(56) References Cited

U.S. PATENT DOCUMENTS

| 5,613,048 | A | 3/1997 | Chen et al. |
|---|---|---|---|
| 6,484,101 | B1 | 11/2002 | Lucas et al. |
| 7,015,926 | B2 | 3/2006 | Zitnick, III et al. |
| 7,113,635 | B2 | 9/2006 | Robert et al. |
| 7,126,598 | B2 | 10/2006 | Oh et al. |
| 2007/0024614 | A1* | 2/2007 | Tam et al. ............ 345/419 |
| 2007/0171381 | A1 | 7/2007 | Tan et al. |
| 2007/0174010 | A1 | 7/2007 | Bhat et al. |
| 2008/0232716 | A1* | 9/2008 | Plagne ................ 382/285 |

OTHER PUBLICATIONS

Multi-Flash Stereopsis: Depth Edge Preserving Stereo with Small Baseline Illumination, Feris et al., 2006.*
A Comparative Study on Color Edge Detection, Koschan, 1995.*
Height from Gradient with Surface Curvature and Area Constraints, Wei, 2001.*
Wei, T., et al., "Height from Gradient with Surface Curvature and Area Constraints", CITR-TR-109, Dec. 2001.
Frankot, R. T., et al., "A Method for Enforcing Integrability in Shape from Shading Algorithms", IEEE Transactions on Pattern Analysis and Machine Intelligence, vol. 10, No. 4, pp. 439-451, Jul. 1988.
Wang, John., et al., "Representing Moving Images with Layers", IEEE Transactions on Image Processing Special Issue: Image Sequence Compression, vol. 3, No. 5, pp. 625-638, Sep. 1994.

* cited by examiner

*Primary Examiner* — Ulka Chauhan
*Assistant Examiner* — Phong Nguyen

(57) ABSTRACT

Disclosed are embodiments of systems and methods for synthesizing a detailed depth map from a video image. In embodiments, the motion vectors decoded from a video stream may be classified into groups by the application of K-Model clustering techniques based on an affine model. In embodiments, a coarse depth map of the image pixels may be generated using the image segmented according to the motion vector clusters. In embodiments, high resolution gradient maps of the image may be generated using the coarse depth map as well as edge information from the image. In embodiments, a surface reconstruction algorithm, such as the Frankot-Chellappa algorithm, may be applied to the high resolution gradient maps to synthesize a detailed depth map of the image. A detailed depth map of an image may be used to render a three-dimensional surface, for example.

20 Claims, 10 Drawing Sheets

700

```
┌─────────────────────────────────┐
│ Create a higher resolution coarse gradient │
│ map by upsampling the original coarse depth │ ─── 705
│              map                │
└─────────────────────────────────┘
                 │
                 ▼
┌─────────────────────────────────┐
│ Use edge detection method to identify image │ ─── 710
│              edges              │
└─────────────────────────────────┘
                 │
                 ▼
┌─────────────────────────────────┐
│ Generate a pair of gradient maps from the │
│ higher resolution coarse gradient depth map │ ─── 715
└─────────────────────────────────┘
```

FIGURE 7

SYNTHESIZING DETAILED DEPTH MAPS FROM IMAGES

BACKGROUND

A. Technical Field

The present invention pertains generally to image processing, and relates more particularly to image processing for synthesis of a detailed depth map from a video image.

B. Background of the Invention

A digital video image, or a frame captured from a video stream, includes motion vectors that may be decoded from the video stream in addition to the digital image that is represented in an array of image picture elements, or "pixels." Each pixel has both a location in the array as well as a set of characteristics that may include color intensity. The motion vectors associated with a video image are distributed within a grid that overlays the image; each grid cell corresponds to a group of pixels. The motion vectors in MPEG video streams typically are available in sparse form, which means that each grid cell corresponds to a group of pixels.

SUMMARY OF THE INVENTION

Systems and methods are described for synthesizing a detailed depth map from a video image. In embodiments, the motion vectors decoded from a video stream may be classified into groups by the application of K-Model clustering techniques based on an affine model. In embodiments, a coarse depth map of the image pixels may be generated using the image segmented according to the motion vector clusters. In embodiments, high resolution gradient maps of the image may be generated using the coarse depth map as well as edge information from the image. In embodiments, an algorithm for constructing a surface from gradient information, such as the Frankot-Chellappa algorithm, may be applied to the high resolution gradient maps to synthesize a detailed depth map of the image. A detailed depth map of an image may be used to render, for example, a three-dimensional surface.

In embodiments, a method for generating a depth map from an image comprising pixels and motion vectors correlated to the pixels may comprise the steps of using the motion vectors to group the image into regions; defining a border region between at least some of the regions; generating a coarse depth map by assigning depth values to at least some of the regions and assigning depth values to pixels in the border region; and computing gradient information using at least some edge information from the image and a gradient map derived from the coarse depth map. In embodiments, the method further comprises obtaining the depth map by applying a surface reconstruction technique for surface gradient integration such as, in certain embodiments, applying the Frankot-Chellappa method.

In embodiments, the step of defining a border region between at least some of the regions may comprise the steps of dilating pixels in a first region to obtain a first dilated region, dilating pixels in a second region to obtain a second dilated region, and defining a border region containing at least one dilated pixel that is identified in both the first region and the second region.

In embodiments, the step of assigning depth values to pixels in the border region may comprise blending by a weighted factor related to a border region pixel's position between the first dilated region and the second dilated region.

In embodiments, computing gradient information may comprise the steps of generating a coarse gradient map by upsampling the coarse depth map; obtaining edge information from the image; and generating edge gradient maps using the edge information and depth values from pixels in the border regions.

In embodiments, obtaining edge information from the image may applying an edge detector to a set of color channels for a pixel, recording a maximum value across the set of color channels In embodiments, using the motion vectors to group the image into regions may comprise the steps of initializing a set of affine models; assigning each motion vector of the image to an affine model; adjusting each affine model by fitting the motion vectors that have been assigned to the affine model; iterating the steps of assigning each motion vector and adjusting each model until there are no vector assignment changes; and segmenting the image into regions. In embodiments, a region corresponds to the pixels associated with the motion vectors assigned to an affine model.

In embodiments, a method for generating a depth map from an image comprising pixels and motion vectors correlated to the pixels may comprise the steps of using a set of affine models and the motion vectors to groups the image into regions; defining a border region between at least some of the regions; generating a coarse depth map by assigning depth values to at least some of the regions and assigning depth values to pixels in the border region by blending the depth values of the regions that neighbor the border region; obtaining edge information fro the image; generating an upsampled coarse depth map from the coarse depth map; generating gradient information using the edge information and at least one gradient map of the upsampled coarse depth map; and generating a depth map by applying a surface reconstruction technique such as, in some embodiments, applying the Frankot-Chellappa algorithm, to the gradient information.

In embodiments, a system for generating a depth map from a video image may comprise a motion vector modeler, a coarse depth map generator, and a detailed depth map synthesizer.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood the scope of the invention is not limited to these particular embodiments.

FIG. 7 depicts a method for generating gradient maps from a coarse gradient map and edge information according to various embodiments of the invention.

DETAILED DESCRIPTION OF THE PREFERRED EMBODIMENTS

Figure 1:
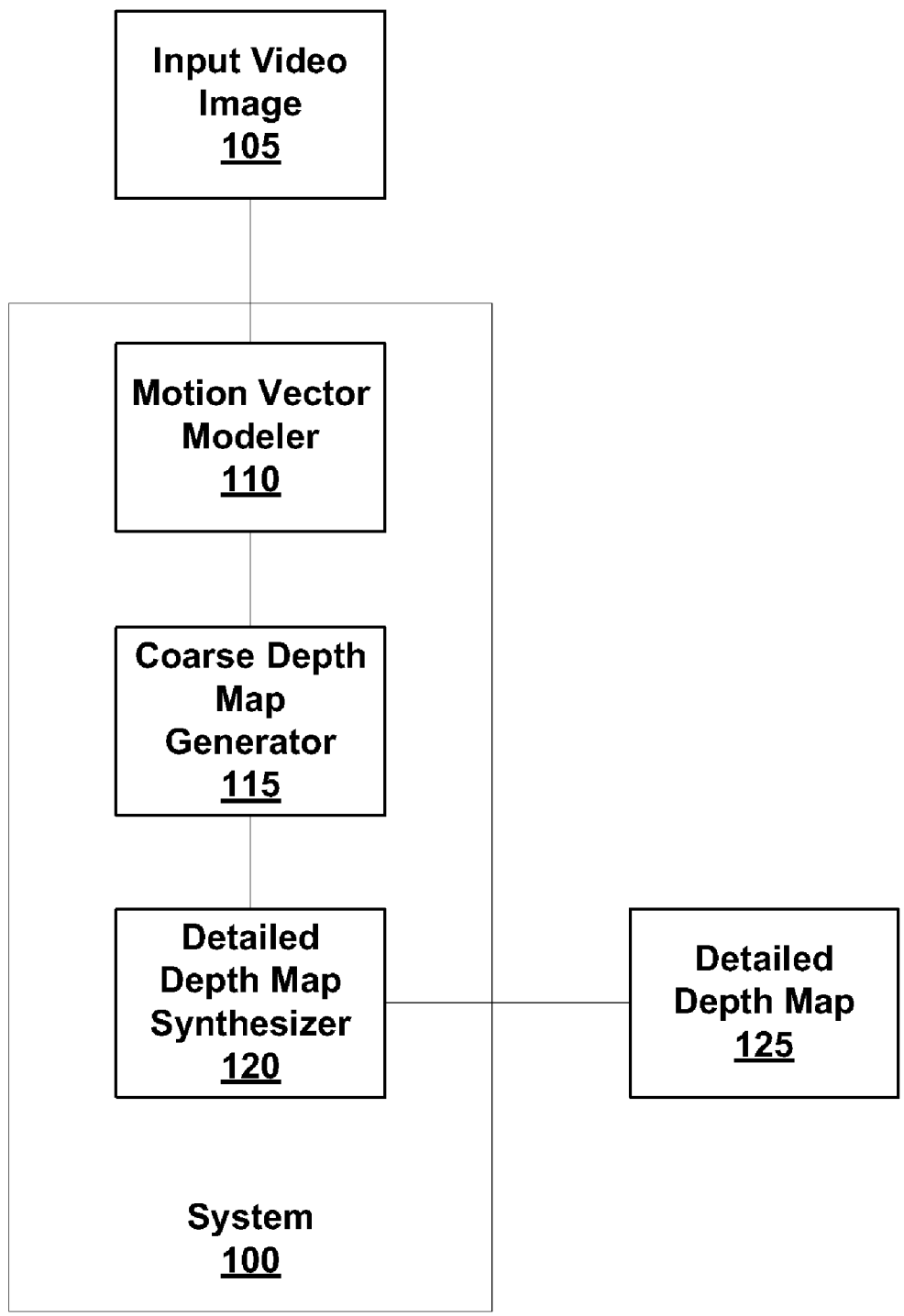
FIG. 1 depicts a block diagram of a system for synthesizing a detailed depth map from a video image according to various embodiments of the invention.

A method for associating information from motion vectors with video image objects represented by the image pixels may use the motion vectors to assign a depth value characteristic to the image pixels. A "depth map" of an image may be created by representing the array of depth values of the image pixels.

Applications that include alignment of multiple projectors, such as configuring a stereo three-dimensional projection system, may make use of the depth maps of the video images. The sparse distribution of the motion vectors makes it difficult to use the depth information to align objects, for example. A detailed depth map of video images would be a more satisfactory solution for these sorts of applications.

Systems and methods are described for synthesizing a detailed depth map from a video image. In embodiments, the motion vectors decoded from a video stream may be classified into groups by the application of K-Model clustering techniques based on an affine model. In embodiments, a coarse depth map of the image pixels may be generated using the image segmented according to the motion vector clusters. In embodiments, high resolution gradient maps of the image may be generated using the coarse depth map as well as edge information from the image. In embodiments, a surface reconstruction algorithm, such as the Frankot-Chellappa algorithm, may be applied to the high resolution gradient maps to synthesize a detailed depth map of the image. A detailed depth map of an image may be used to render a three-dimensional surface, for example.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, mobile devices, including those devices with a display or camera capabilities, multimedia devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "an embodiment," or "embodiments" means that a particular feature, structure, characteristic, or function described in connection with the embodiment is included in at least one embodiment of the invention and may be in more than one embodiment. The appearances of the phrase "in one embodiment," "in an embodiment," or "in embodiments" in various places in the specification are not necessarily all referring to the same embodiment.

A. System Implementations

FIG. 1 depicts a system 100 for synthesizing a detailed depth map 125 from an input video image 105 according to various embodiments of the invention. System 100 comprises a motion vector modeler 110, a coarse depth map generator 115, and a detailed depth map synthesizer 120.

In embodiments, motion vector modeler 110 receives a set of motion vectors decoded from a video image and groups the motion vectors into sets of vectors that are each represented by a different model. In embodiments, the motion vectors may have been decoded from an MPEG video stream, and the vectors may be in a sparse form such as, for example, 1 vector per 16-by-16 block of pixels. In embodiments, an affine model may be used to represent a group of vectors. The motion vectors of an image may be grouped into K clusters such that each cluster corresponds to a different affine model. Those skilled in the art will recognize that both the choice of affine model parameters and the number, K, of affine models selected are not critical to the invention.

In embodiments, coarse depth map generator 115 receives a video image in which at least some of the pixels have been assigned to regions based on motion vector clustering, and uses that clustering information to synthesize a coarse depth map of the image. In embodiments, an image may be segmented into regions based on at least some of the K clusters that were created around K affine models. For example, in certain embodiments, the motion vectors of an image may have been clustered into two regions corresponding to the foreground and background layers of an image. In embodiments, the image pixels in each segmented region may be dilated using a morphological dilation operation. Those skilled in the art will recognize that many sizes and shapes of dilation objects may be used in a morphological dilation operation, and that the choice of dilation object is not critical to the invention. In embodiments, a border region may be identified as the intersection of two or more dilated regions of an image. In embodiments illustrated by the example of an image segmented into two regions, a border region may be identified as the region of intersection of the foreground and background layers of the image.

In embodiments, a depth value may be assigned to each segmented region of an image, and the pixels within each region may be assigned the depth value that has been assigned to their corresponding region. In embodiments, the depth value of each pixel within a border region may be calculated as a function of the distance of the pixel from each of the regions neighboring the border region. In embodiments illustrated by the example of an image segmented into two regions such as a foreground and a background region, the depth value of each pixel within a border region may be calculated according to this equation:

$$z_{cb} = z_f \times \frac{d_b}{d_b + d_f} + z_b \times \frac{d_f}{d_b + d_f} \quad (1)$$

where $z_{cb}$ is the calculated depth value of a pixel within a border region, $z_f$ and $z_b$ are the depth values assigned to the foreground and background layers, respectively, and $d_f$ and $d_b$ are the distances from the pixel to the foreground and background regions, respectively.

In embodiments, a coarse depth map of an image may be created using the depth values assigned to the image pixels. It should be noted that this coarse depth map has the same resolution as the grid of motion vectors that were decoded for an image. For example, a depth map generated for an MPEG image where one motion vector represents a 16-by 16 block of pixels will have each single point in the depth map representing a 16-by-16 block of pixels. This sparse resolution may result in jagged edges between image layers in the coarse depth map and will likely not be aligned with edges of objects in the image.

In embodiments, detailed depth map synthesizer 120 receives a coarse depth map and a video image, and uses that input to synthesize a detailed depth map of the image. In embodiments, a higher resolution coarse gradient map of the image may be generated by upsampling the coarse depth map. Those skilled in the art will recognize that the selection of upsampling parameters or methods to apply is not critical to the invention.

In embodiments, an edge detection method may be applied to the image to identify the edge pixels in an image. Those skilled in the art will recognize that numerous edge detection methods exist and that the selection of a particular method is not critical to the invention. One example of an edge detection method is Sobel edge detection in which horizontal and vertical Sobel operators may be applied to the pixels of an image to detect both horizontal and vertical edges. The intensity gradient values in both horizontal ($E_x$) and vertical ($E_y$) directions may be computed for each pixel in the image. A pixel having a gradient magnitude larger than a predefined threshold may be classified as an edge pixel.

In embodiments, the Sobel operators may be applied to all the color channels, such as RGB channels for example, of the image so that the maximum gradient value across the channels at each pixel may be kept in both orientations. In embodiments, a pair of gradient maps for an image may be produced using the edge information from the application of an edge detector and the depth information from the coarse depth map according to these equations:

$$G_x(p) = (E(p) > T_e) \times \Delta_x z(p) \quad (2)$$

$$G_y(p) = (E(p) > T_e) \times \Delta_y z(p) \quad (3)$$

where, at point p, $G_x(p)$ is the horizontal gradient value, $G_y(p)$ is the vertical gradient value, $\Delta_x z(p)$ is the rate of change of the depth value from the upsampled coarse depth map along the horizontal (x) direction, $\Delta_y z(p)$ is the rate of change of the depth value from the upsampled coarse depth map along the vertical (y) direction, E(p) is the edge value, and $T_e$ is a preset threshold value (in embodiments, an example threshold value is 20%). In embodiments, the gradient values from the coarse depth map may be said to be gated by the edge values, so that gradients are present only where edges exist.

In embodiments, a high resolution depth map of an image may be synthesized by using a surface reconstruction technique for surface gradient integration. This technique takes as input a gradient map and generates a depth map. In embodiments, the Frankot-Chellappa Fourier basis projection technique may be used but those skilled in the art will recognize that another projection technique may be selected, but one skilled in the art shall recognize that other algorithms for constructing a surface from gradient information may be employed. In embodiments, a high resolution depth map of a video image may be computed by applying the Frankot-Chellappa algorithm to the pair of detailed gradient maps produced as disclosed above.

In embodiments, a detailed depth map of a video image may be used to render a three-dimensional surface, for example.

B. Methods for Synthesizing a Detailed Depth Map from a Video Image

Figure 2:
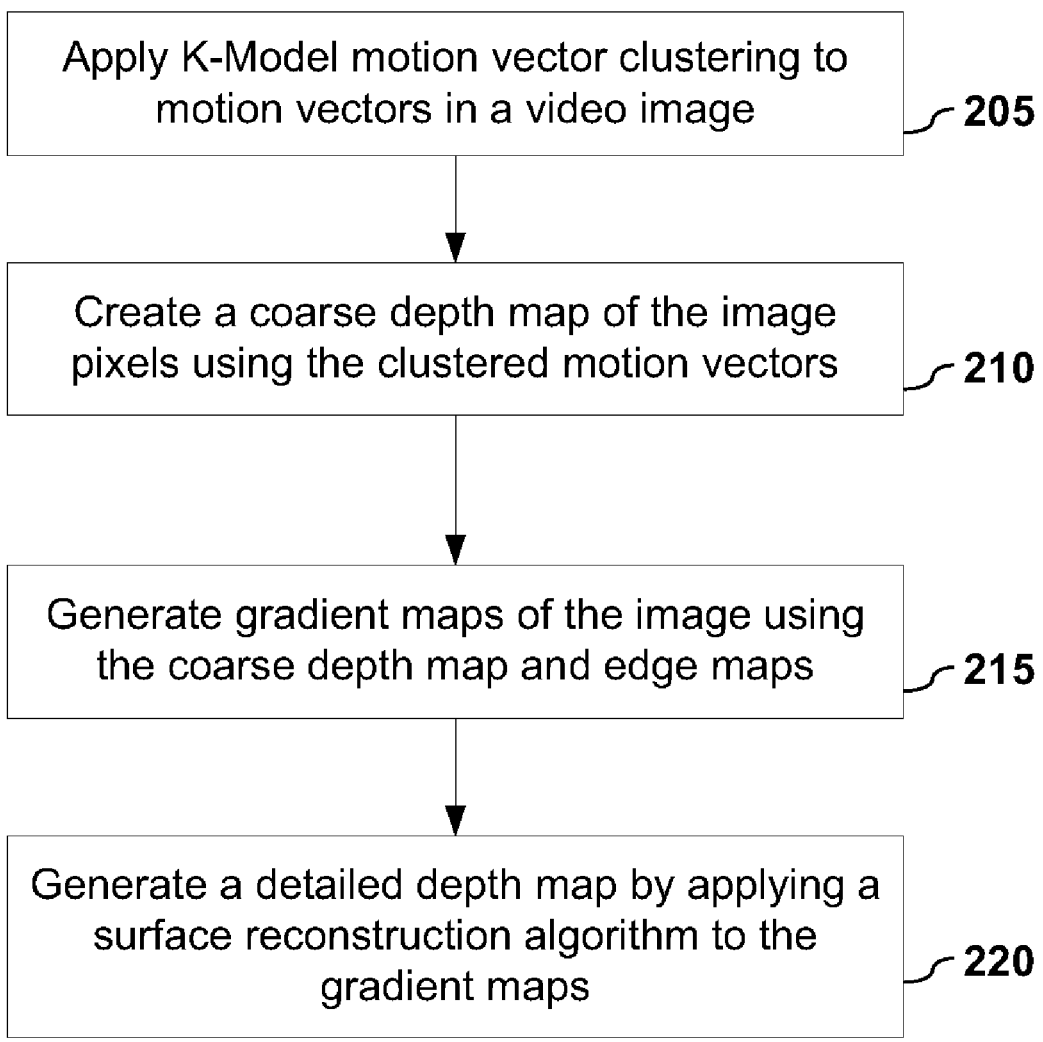
FIG. 2 depicts a method for synthesizing a detailed depth map from a video image according to various embodiments of the invention.

FIG. 2 depicts a method 200 for synthesizing a detailed depth map from a video image according to embodiments of the invention. Method 200 comprises the steps of applying K-Model motion vector clustering to motion vectors decoded from an image (step 205), creating a coarse depth map of the image pixels (step 210), generating gradient maps of the image (step 215), and generating a detailed depth map by applying a surface reconstruction algorithm to image gradient maps (step 220). Method 200 may be implemented by embodiments of system 100.

1. K-Model Motion Vector Clustering

Figure 3A:
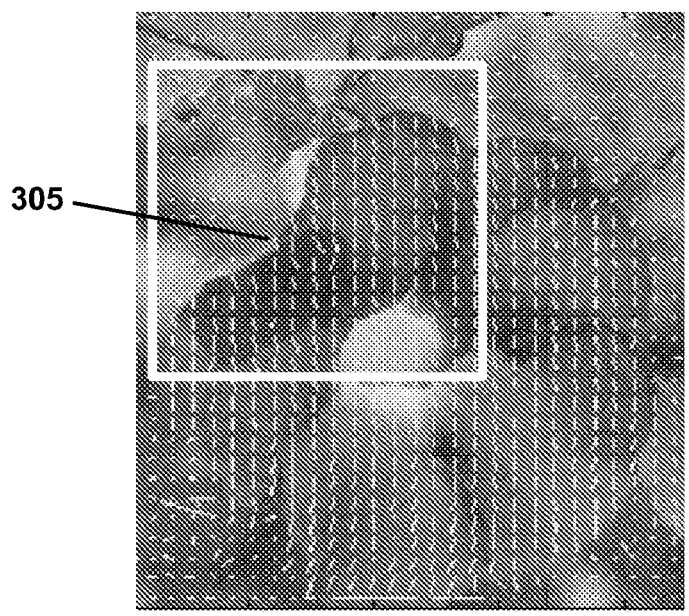
FIG. 3A is an example of a video image illustrating motion vectors according to various embodiments of the invention.
Figure 3B:
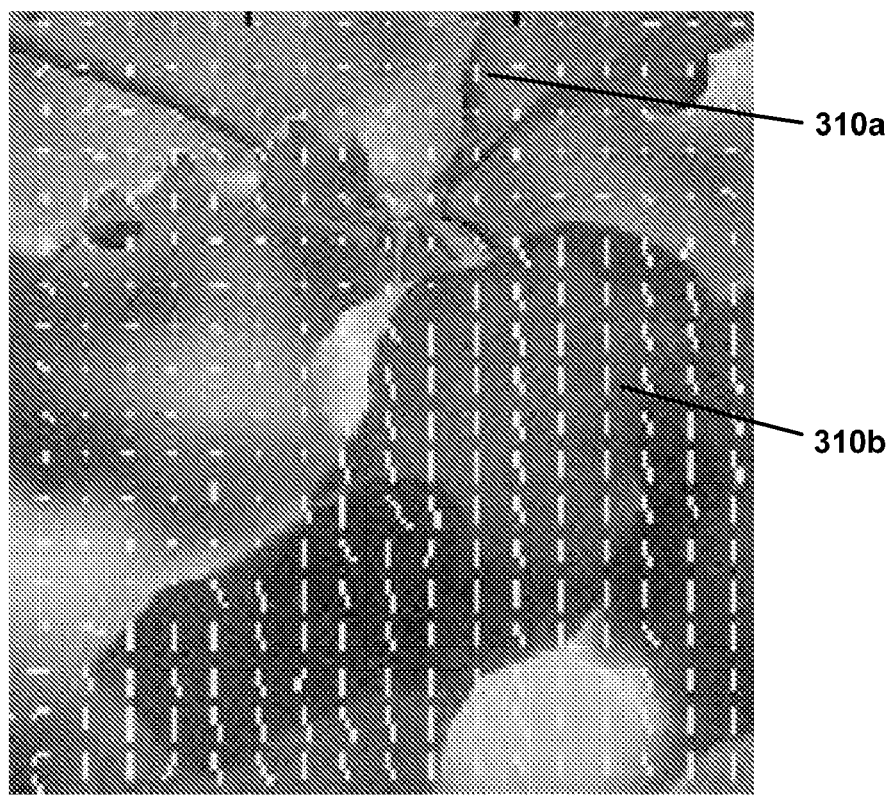
FIG. 3B is an enlargement of a region of the video image example in FIG. 3A according to various embodiments of the invention.

FIG. 3A illustrates an MPEG video image from which motion vectors have been decoded. An enlargement of a portion of the image (305) is illustrated in FIG. 3B. In embodiments in which the motion vectors may have been decoded from an MPEG video stream, the vectors (310a and 310b) may be in a sparse form such as, for example, one vector per 16-by-16 block of pixels.

Figure 4:
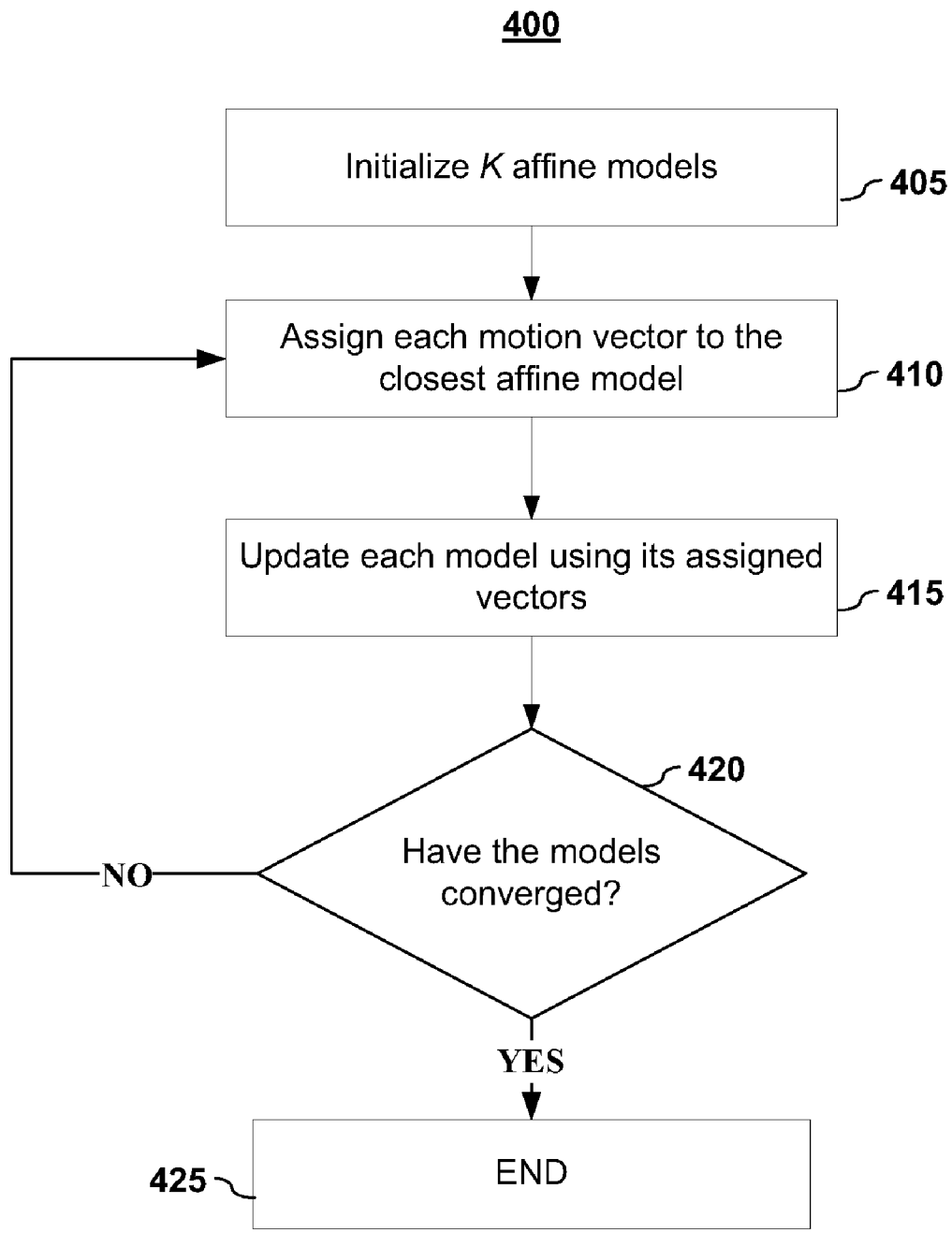
FIG. 4 depicts a method for assigning the vectors in a video image to a set of affine models according to various embodiments of the invention.

FIG. 4 depicts a method 400 for using K-Model motion vector clustering to classify the motion vectors of an image into groups. Method 400 may be implemented as step 205 in method 200 and in embodiments of motion vector modeler 110.

In commonly-owned U.S. patent application Ser. No. 11/294,023 (U.S. Pub. No. 2007/0126938 A1), entitled "Immersive Surround Visual Fields," listing Kar-Han Tan and Anoop Bhattacharjya as inventors and filed on Dec. 5, 2005, which is incorporated herein by reference in its entirety, it is discussed how sparse motion vectors decoded from an MPEG video stream may be represented by an affine model. The model parameters may be estimated by a linear least squares fit as follows. Given n optic flow vectors and thus n corresponding pairs of points $(x_1, y_1) \ldots (x_n, y_n)$ and $(u_1, v_1) \ldots (u_n, v_n)$, the solving of:

$$\begin{pmatrix} u_1 \\ \vdots \\ u_n \\ v_1 \\ \vdots \\ v_n \end{pmatrix} = \begin{pmatrix} 1 & x_1 & y_1 & 0 & 0 & 0 \\ & \vdots & & & \vdots & \\ 1 & x_n & y_n & 0 & 0 & 0 \\ 0 & 0 & 0 & 1 & x_1 & y_1 \\ & \vdots & & & \vdots & \\ 0 & 0 & 0 & 1 & x_n & y_n \end{pmatrix} \begin{pmatrix} a_1 \\ a_2 \\ a_3 \\ a_4 \\ a_5 \\ a_6 \end{pmatrix} \quad (4)$$

give the values of $a_1$, $a_2$, $a_3$, $a_4$, $a_5$, and $a_6$, the least squares solution for an affine model.

In embodiments, an affine model may be used to represent a group of vectors. The motion vectors of an image may be grouped into K clusters such that each cluster corresponds to a different affine model. Those skilled in the art will recognize that both the initial choice of affine model parameters and the number, K, of affine models selected are not critical to the invention.

In step 405, K affine models are initialized with random parameter values. Each image motion vector is assigned to the group of the model that most closely predicts the vector (step 410). After all image motion vectors have been assigned, each model may be updated by estimating its parameters using the vectors in its group (step 415). If vectors need to be re-assigned to different groups after the model update (step 420), steps 410 and 415 are repeated until the groups are stable (step 425).

2. Coarse Depth Map Synthesis

Figure 5:
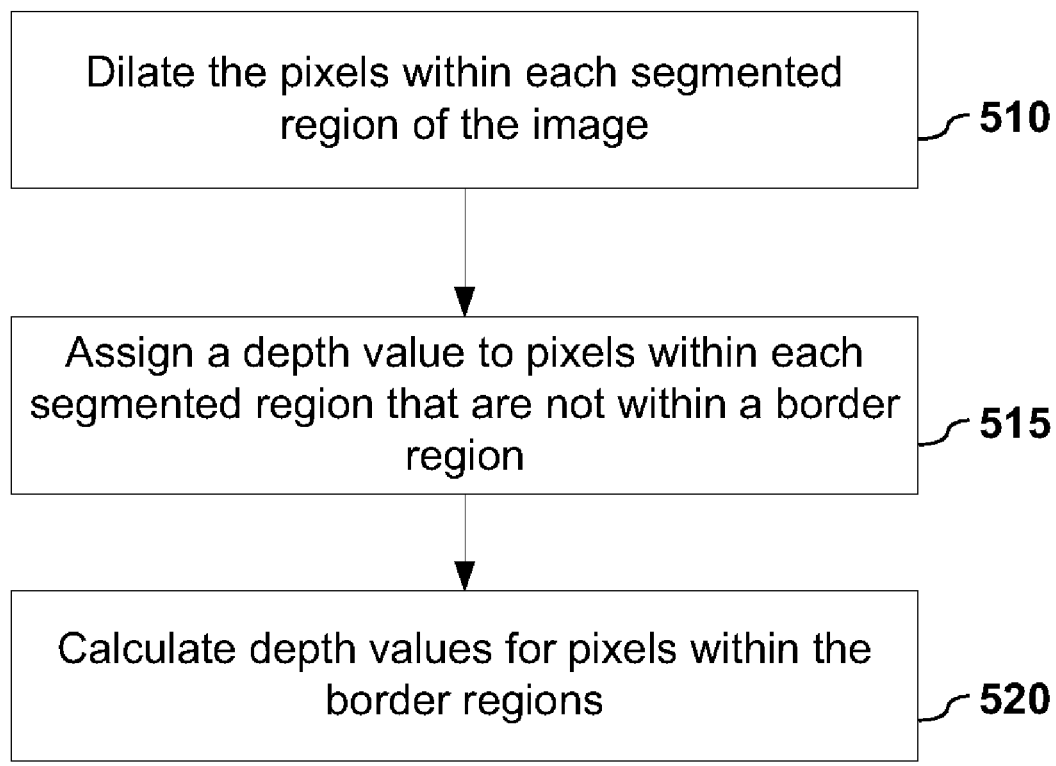
FIG. 5 depicts a method for assigning depth values to pixels within segmented regions of a video image according to various embodiments of the invention.

FIG. 5 depicts a method 500 for synthesizing a coarse depth map of a video image according to embodiments of the invention. Method 500 may be implemented as step 210 in method 200 and in embodiments of coarse depth map generator 115.

In embodiments, an image may be segmented into regions based on at least some of the K clusters that were created around K affine models. For example, in certain embodiments, the motion vectors of an image may have been clustered into two regions corresponding to the foreground and background layers of an image. In embodiments, the image pixels in each segmented region may be dilated using a morphological dilation operation (step 510). Those skilled in the art will recognize that many sizes and shapes of dilation objects may be used in a morphological dilation operation, and that the choice of dilation object is not critical to the invention. In embodiments, a border region may be identified as the intersection of two or more dilated regions of an image. In embodiments illustrated by the example of an image segmented into two regions, a border region may be identified as the region of intersection of the foreground and background layers of the image.

Figure 6A:
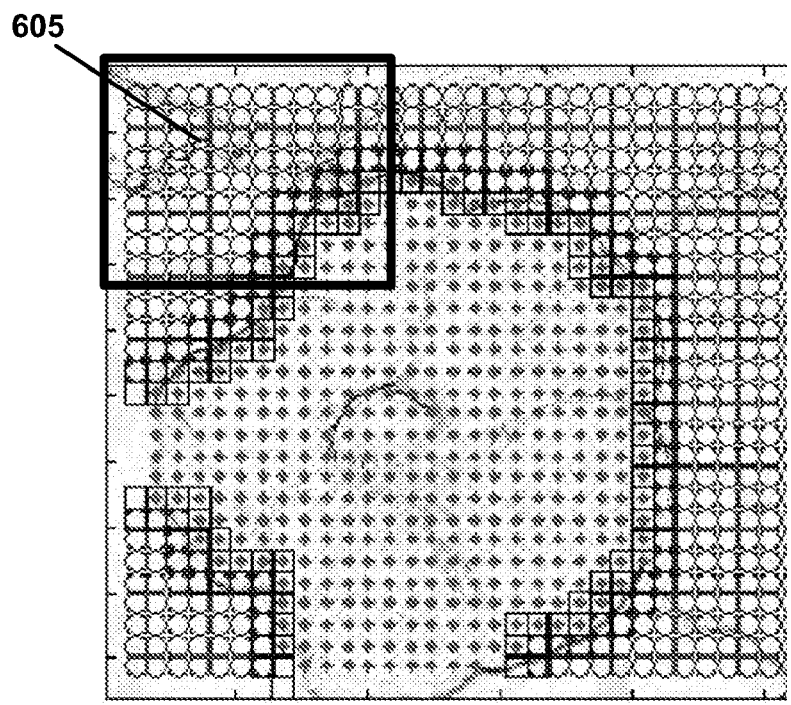
FIG. 6A illustrates an example of dilated pixels within segmented regions of a video image according to various embodiments of the invention.
Figure 6B:
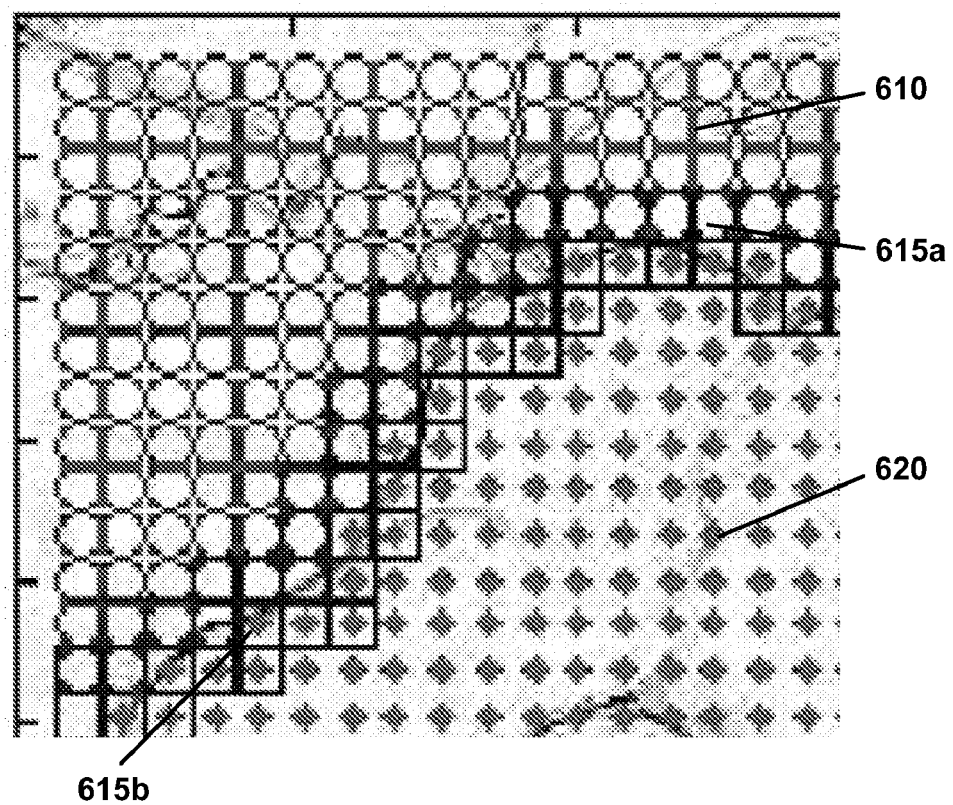
FIG. 6B is an enlargement of a region of the video image example in FIG. 6A according to various embodiments of the invention.

FIG. 6A illustrates the MPEG image of FIG. 3A with its dilated pixels segmented into regions according to embodiments of the invention. An enlargement of a portion of the image (605) is illustrated in FIG. 6B. In this example, there are a foreground region (620), a background region (610), and a border region (615a and 615b) where the two regions intersect.

Figure 8A:
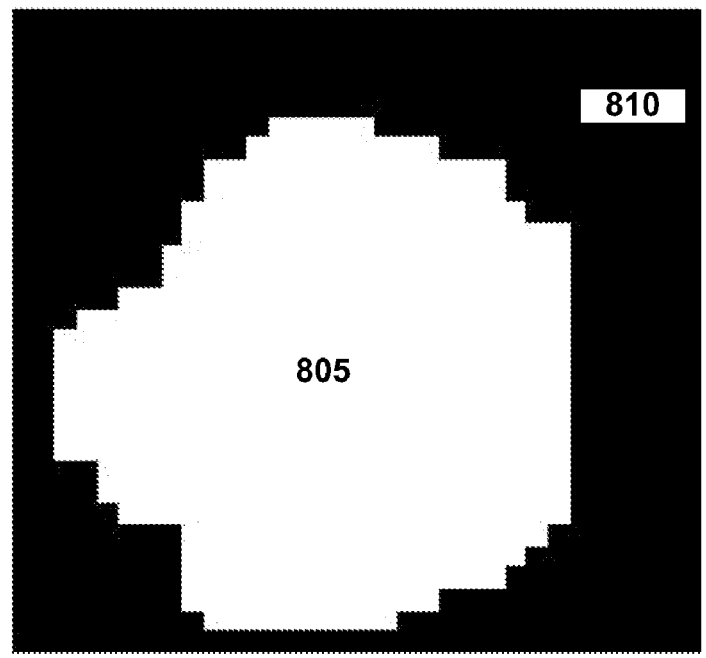
FIG. 8A illustrates an example of a video image that is segmented based on motion vectors according to various embodiments of the invention.

FIG. 8A illustrates two segmented regions created for the MPEG image illustrated in FIG. 3A. The pixels of the foreground layer (805) are colored white while the pixels of the background layer (810) are colored black in this illustration. The edges are not smooth because the resolution of the depth map is the same as the resolution of the grid of motion vectors in FIG. 3A.

In embodiments, a depth value may be assigned to each segmented region of an image, and the pixels within each region may be assigned the depth value that has been assigned to their corresponding region (step 515). In embodiments, the depth value of each pixel within a border region may be calculated as a function of the distance of the pixel from each of the regions neighboring the border region (step 520). In embodiments illustrated by the example of an image segmented into two regions, such as a foreground and a background region, the depth value of each pixel within a border region may be calculated according to this equation:

$$z_{cb} = z_f \times \frac{d_b}{d_b + d_f} + z_b \times \frac{d_f}{d_b + d_f} \quad (1)$$

where $z_{cb}$ is the calculated depth value of a pixel within a border region, $z_f$ and $z_b$ are the depth values assigned to the foreground and background layers, respectively, and $d_f$ and $d_b$ are the distances from the pixel to the foreground and background regions, respectively.

In embodiments, a coarse depth map of an image may be created using the depth values assigned to the image pixels. It should be noted that this coarse depth map has the same resolution as the grid of motion vectors that were decoded for an image. For example, a depth map generated for an MPEG image where one motion vector represents a 16-by 16 block of pixels will have each single point in the depth map representing a 16-by-16 block of pixels. This sparse resolution may result in jagged edges between image layers in the coarse depth map and will likely not be aligned with edges of objects in the image.

3. Detailed Gradient Map Generation

FIG. 7 depicts a method 700 for generating a detailed gradient map of a video image according to embodiments of the invention. Method 700 may be implemented as step 215 of method 200 and in embodiments of detailed depth map synthesizer 120.

In embodiments, a higher resolution coarse gradient map of the image may be generated by upsampling the coarse depth map (step 705). Those skilled in the art will recognize that the selection of the upsampling method is not critical to the invention.

In embodiments, an edge detection method may be applied to the image to identify the edge pixels in an image (step 710). Those skilled in the art will recognize that numerous edge detection methods exist and that the selection of a particular method is not critical to the invention. One example of an edge detection method is Sobel edge detection in which horizontal and vertical Sobel operators may be applied to the pixels of an image to detect both horizontal and vertical edges. The intensity gradient values in both horizontal ($E_x$) and vertical ($E_y$) directions may be computed for each pixel in the image. A pixel having a gradient magnitude larger than a predefined threshold may be classified as an edge pixel.

In embodiments, the Sobel operators may be applied to all the color channels, such as RGB channels for example, of the image so that the maximum gradient value across the channels at each pixel may be kept in both orientations. In embodiments, a pair of gradient maps for an image may be produced using the edge information from the application of an edge detector and the depth information from the coarse depth map according to these equations:

$$G_x(p) = (E(p) > T_e) \times \Delta_x z(p) \quad (2)$$

$$G_y(p) = (E(p) > T_e) \times \Delta_y z(p) \quad (3)$$

where, at point p, $G_x(p)$ is the horizontal gradient value, $G_y(p)$ is the vertical gradient value, $\Delta_x z(p)$ is the rate of change of the depth value from the upsampled coarse depth map along the horizontal (x) direction, $\Delta_y z(p)$ is the rate of change of the depth value from the upsampled coarse depth map along the vertical (y) direction, $E(p)$ is the edge value, and $T_e$ is a preset threshold value (in embodiments, an example threshold value is 20%). In embodiments, the gradient values from the coarse depth map may be said to be gated by the edge values, so that gradients are present only where edges exist.

4. Detailed Depth Map Generation

In step 220 of method 200 and embodiments of detailed depth map synthesizer 120, a high resolution depth map of an image may be synthesized by using a surface reconstruction technique for surface gradient integration. This technique takes as input a gradient map and generates a depth map. In embodiments, the Frankot-Challappa Fourier basis projection technique may be used but those skilled in the art will recognize that other surface reconstruction techniques may be selected. In embodiments, a high resolution depth map of a video image may be computed by applying the Frankot-Chellappa algorithm to the pair of detailed gradient maps produced as disclosed above.

Figure 8B:
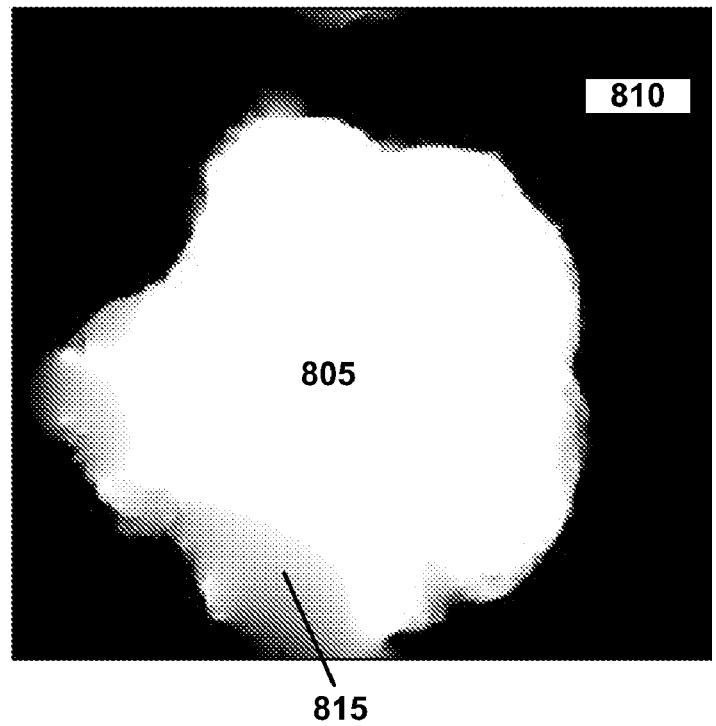
FIG. 8B illustrates an example of a detailed gradient map generated from the same video image as illustrated in FIG. 8A according to various embodiments of the invention.

FIG. 8B illustrates the detailed depth map created for the MPEG image illustrated in FIG. 3A. The pixels of the foreground layer (805) are colored white, the pixels of the background layer (810) are colored black, and the pixels in the blended border regions along the edges are colored in shades of gray in this illustration. The edges are smoothed compared to the edges in the image pixel map illustrated in FIG. 8A, and are closer to the edges in the input image illustrated in FIG. 3A.

Figure 9:
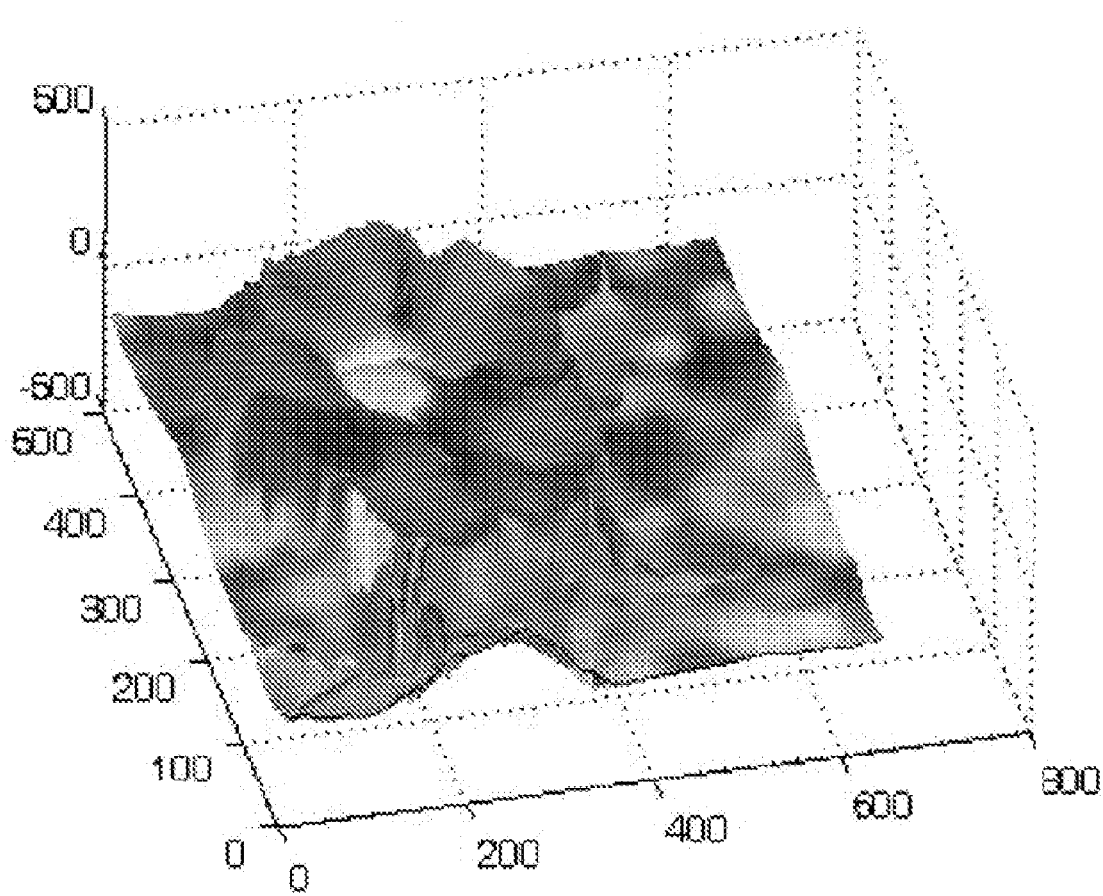
FIG. 9 illustrates an example of a three-dimensional image generated from a detailed gradient map of a video image according to various embodiments of the invention.

In embodiments, a detailed depth map of a video image may be used to render a three-dimensional surface, for example. One skilled in the art shall recognize that a standard texture mapping operation may be used to render the three-dimensional surface and that no particular texture mapping operation is critical. FIG. 9 illustrates a three-dimensional image that has been rendered from the depth map illustrated in FIG. 8B.

It shall be noted that the present invention may be implemented in any instruction-execution/computing device or system capable of processing the image data, including without limitation, a general-purpose computer and a specific computer, such as one intended for graphics processing. The present invention may also be implemented into other computing devices and systems, including without limitation, a digital camera, a printer, a scanner, a multiple function printer/scanner, a facsimile machine, a multimedia device, and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 10:
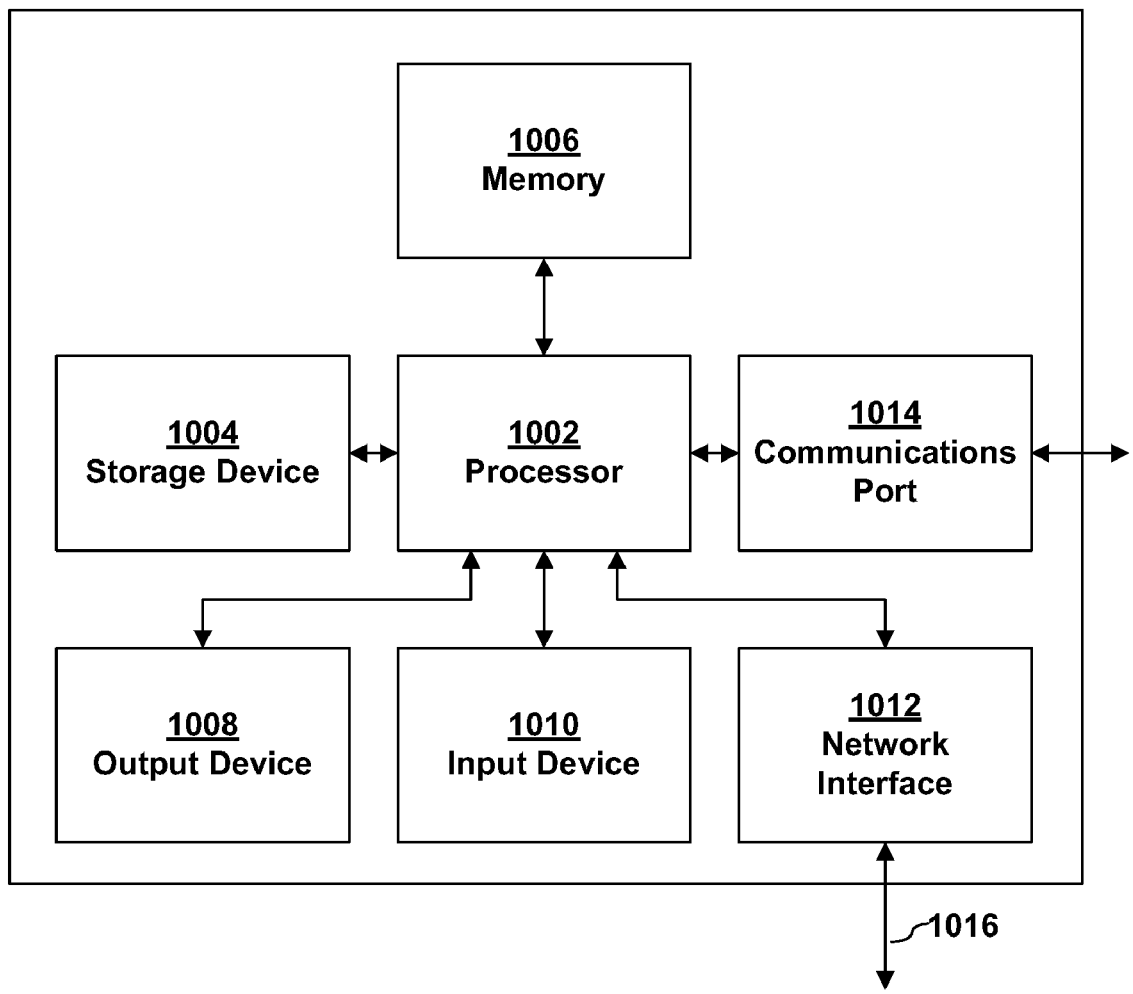
FIG. 10 depicts a block diagram of a computing system according to various embodiments of the invention.

FIG. 10 depicts a functional block diagram of an embodiment of an instruction-execution/computing device 1000 that may implement or embody embodiments of the present invention. As illustrated in FIG. 10, a processor 1002 executes software instructions and interacts with other system components. In an embodiment, processor 1002 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1004, coupled to processor 1002, provides long-term storage of data and software programs. Storage device 1004 may be a hard disk drive and/or another device capable of storing data, such as a computer-readable media (e.g., diskettes, tapes, compact disk, DVD, and the like) drive or a solid-state memory device. Storage device 1004 may hold programs, instructions, and/or data for use with processor 1002. In an embodiment, programs or instructions stored on or loaded from storage device 1004 may be loaded into memory 1006 and executed by processor 1002. In an embodiment, storage device 1004 holds programs or instructions for implementing an operating system on processor 1002. In one embodiment, possible operating systems include, but are not limited to, UNIX, AIX, LINUX, Microsoft Windows, and the Apple MAC OS. In embodiments, the operating system executes on, and controls the operation of, the computing system 1000.

An addressable memory 1006, coupled to processor 1002, may be used to store data and software instructions to be executed by processor 1002. Memory 1006 may be, for example, firmware, read only memory (ROM), flash memory, non-volatile random access memory (NVRAM), random access memory (RAM), or any combination thereof. In one embodiment, memory 1006 stores a number of software objects, otherwise known as services, utilities, components, or modules. One skilled in the art will also recognize that storage 1004 and memory 1006 may be the same items and function in both capacities. In an embodiment, one or more of the components of FIG. 1 may be modules stored in memory 1004, 1006 and executed by processor 1002.

In an embodiment, computing system 1000 provides the ability to communicate with other devices, other networks, or both. Computing system 1000 may include one or more network interfaces or adapters 1012, 1014 to communicatively couple computing system 1000 to other networks and devices. For example, computing system 1000 may include a network interface 1012, a communications port 1014, or both, each of which are communicatively coupled to processor 1002, and which may be used to couple computing system 1000 to other computer systems, networks, and devices.

In an embodiment, computing system 1000 may include one or more output devices 1008, coupled to processor 1002, to facilitate displaying graphics and text. Output devices 1008 may include, but are not limited to, a display, LCD screen, CRT monitor, printer, touch screen, or other device for displaying information. Computing system 1000 may also include a graphics adapter (not shown) to assist in displaying information or images on output device 1008.

One or more input devices 1010, coupled to processor 1002, may be used to facilitate user input. Input device 1010 may include, but are not limited to, a pointing device, such as a mouse, trackball, or touchpad, and may also include a keyboard or keypad to input data or instructions into computing system 1000.

In an embodiment, computing system 1000 may receive input, whether through communications port 1014, network interface 1012, stored data in memory 1004/1006, or through an input device 1010, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for generating a depth map from an image comprising pixels and motion vectors correlated to the pixels, the method comprising:
    (a) grouping the motion vectors into a predefined number of vector groups, each motion vector being assigned to an image block encompassing a plurality of pixels, each vector group defining a vector-group area within said image, the perimeter shape of each vector-group area being defined by the outer side of its image blocks along its perimeter;
    (b) defining border regions along the perimeters of adjacent vector-group areas, said border regions having widths spanning into both adjacent vector-group areas, pixels within border regions being border pixels;
    (c) assigning a separate and distinct depth value to each of the vector-group areas;
    (d) defining a first gradient for said image by assigning depth values to border pixels dependent upon their proportional distance to the adjacent vector-group areas that define them and proportional to the depth values of the adjacent vector-group areas that define them;
    (e) defining a second gradient for said image by computing gradient information for only edge pixels of said image, the computed depth gradient information of each edge pixel being dependent upon the rate of change of the depth value of the edge pixel; and
    (f) applying a surface reconstruction technique for surface gradient integration to the second gradient to obtain the depth map.

2. The method of claim 1 wherein in step (b), defining border regions includes:
    dilating the vector-group areas; and
    defining as border regions the intersections of the dilated vector-group areas.

3. The method of claim 1 wherein:
    in step (a), said predefined number of vector groups is two, the vector-group area defined by the first vector group being a background layer, and the vector-group area defined by the second vector group being a foreground layer; and
    in step (d), each border pixel is assigned a depth value according to the following relation:

$$z_{cb} = z_f \times \frac{d_b}{d_b + d_f} + z_b \times \frac{d_f}{d_b + d_f}$$

where $z_{cb}$ is the calculated depth value of the boarder pixel, $z_f$ is the depth value assigned to the foreground layer, $z_b$ is the depth value assigned to the background layer, $d_f$ is the distance from the pixel to the foreground layer abutting the boarder region, and $d_f$ is the distance from the pixel to the background layer abutting the boarder region.

4. The method of claim 1 wherein:
    step (d) further includes upsampling the depth values assigned to the pixels of said image;
    step (e) further includes calculating an edge value, E(p), for each pixel p of said image, the edge value E(p) of each pixel p being a measure indicative of whether the pixel p is an edge pixel; and
    in step (e), the second gradient is defined according to the following relation:

$$G_x(p)=(E(p)>T_e)\times\Delta_x z(p)$$

$$G_y(p)=(E(p)>T_e)\times\Delta_y z(p)$$

where, at pixel p, $G_x(p)$ is the horizontal second gradient value $G_y(p)$ is the vertical second gradient value, $\Delta_x z(p)$ is the rate of change of the depth value from the upsampled first gradient along the horizontal (x) direction, $\Delta_y z(p)$ is the rate of change of the depth value from the upsampled first gradient along the vertical (y) direction, and $T_e$ is a preset threshold value.

5. The method of claim 4 wherein an edge detector is applied to a set of color channels for a pixel p, and E(p) is the maximum value across the pixel's set of color channels obtained by the edge detector.

6. The method of claim 1 wherein the surface reconstruction technique is the Frankot-Chellappa method.

7. The method of claim 1 wherein:
    in step (a), said predefined number of vector groups is two, the vector-group area defined by the first vector group being a background layer, and the vector-group area defined by the second vector group being a foreground layer; and
    the grouping of the motion vectors into the two vector groups includes:
        initializing a set of two affine models;
        assigning each motion vector of the image to an affine model from the set of affine models that most closely predicts the vector;
        adjusting each affine model by fitting the motion vectors that have been assigned to the affine model; and
        iterating the steps of assigning each motion vector to an affine model and adjusting each model until there are no changes to the assigning of each motion vector, the motion vectors assigned to the first model constituting the first vector group and the motion vectors assigned to the second model constituting the second vector group.

8. A non-volatile computer readable medium having instructions for executing the method of claim 1.

9. The method of claim 1, wherein in step (a), each of said vector groups has a plurality of motion vectors.

10. The method of claim 1, wherein in step (b), the widths of said boarder regions are not fixed.

11. The method of claim 1, wherein in step (c), all pixels within a given vector-group area are assigned the same depth value.

12. The method of claim 1, wherein said image portrays a plurality of imaged objects, and in step (a), the perimeters of image blocks are not aligned with said edges of the imaged objects.

13. The method of claim 1, wherein in step (d), the depth values assigned to border pixels are further directly proportional to the depth values of the adjacent vector-group areas that define them.

14. The method of claim 1, wherein in step (a), said pre-defined number of vector groups is two, the vector-group area defined by the first vector group being a background layer, and the vector-group area defined by the second vector group being a foreground layer.

15. A method for generating a depth map from an image comprising pixels and motion vectors correlated to the pixels, the method comprising:
(a) grouping the motion vectors into only two groups constituting a first vector group and a second vector group, each motion vector being assigned to an image block encompassing a plurality of pixels, the first vector group defining background layers within said image and the second vector group defining foreground layers within said image, wherein the perimeter shapes of the background layers are defined by the outer sides of their respective image blocks along their perimeters, and the perimeter shapes of the foreground layers are defined by the outer sides of their respective image blocks along their perimeters;
(b) defining border regions along the perimeters of adjoining background layers and foreground layers, said border regions having widths spanning into the adjoining background layer and foreground layer, pixels within border regions being border pixels, wherein at least some edge pixels of said image do not coincide with said border pixels;
(c) assigning a common first depth value to all pixels within background layers, and assigning a common second depth value to all pixels within said foreground layers, said second depth value being different from said first depth value;
(d) defining a first gradient for said image by reassigning depth values only to border pixels dependent upon their proportional distance to the adjoining background and foreground layers that define them and proportional to the depth values of the adjoining background and foreground layers that define them;
(e) defining a second gradient for said image by computing a rate of change of the depth values for its pixels; and
(f) applying a surface reconstruction technique for surface gradient integration to the second gradient to obtain the depth map.

16. The method of claim 15, wherein in step (e), the rate of change of the depth values is computed only for edge pixels of said image.

17. The method of claim 15, wherein:
step (d) further includes upsampling the depth values of the pixels of said image;
step (e) further includes calculating an edge value, E(p), for each pixel p of said image, the edge value E(p) of each pixel p being a measure indicative of whether the pixel p is an edge pixel; and
in step (e), the second gradient is defined according to the following relation:

$$G_x(p)=(E(p)>T_e) \times \Delta_x z(p)$$

$$G_y(p)=(E(p)>T_e) \times \Delta_y z(p)$$

where, at pixel p, $G_x(p)$ is the horizontal second gradient value, $G_y(p)$ is the vertical second gradient value, $\Delta_x z(p)$ is the rate of change of the depth value from the upsampled first gradient along the horizontal (x) direction, $\Delta_y z(p)$ is the rate of change of the depth value from the upsampled first gradient along the vertical (y) direction, and $T_e$ is a preset threshold value.

18. The method of claim 15, wherein in step (d), each border pixel is reassigned a depth value according to the following relation:

$$z_{cb} = z_f \times \frac{d_b}{d_b+d_f} + z_b \times \frac{d_f}{d_b+d_f}$$

where $z_{cb}$ is the calculated depth value of the boarder pixel, $z_f$ is the depth value assigned to the foreground layer, $z_b$ is the depth value assigned to the background layer, $d_f$ is the distance from the pixel to the foreground layer abutting the boarder region, and $d_f$ is the distance from the pixel to the background layer abutting the boarder region.

19. The method of claim 15, wherein in step (a), the grouping of the motion vectors into said first vector group and said second vector group includes:
initializing a set of two affine models;
assigning each motion vector of the image to an affine model from the set of affine models that most closely predicts the vector;
adjusting each affine model by fitting the motion vectors that have been assigned to the affine model; and
iterating the steps of assigning each motion vector to an affine model and adjusting each model until there are no changes to the assigning of each motion vector, the motion vectors assigned to the first model constituting the first vector group and the motion vectors assigned to the second model constituting the second vector group.

20. The method of claim 15, wherein in step (b), defining border regions includes:
dilating the background layers and the foreground layers; and
defining as border regions the intersections of the dilated background and foreground layers.

* * * * *